US012163908B2

(12) United States Patent
Kampfl et al.

(10) Patent No.: US 12,163,908 B2
(45) Date of Patent: Dec. 10, 2024

(54) MOISTURE MEASURING DEVICE FOR GASES

(71) Applicant: Bauer Kompressoren GmbH, Munich (DE)

(72) Inventors: Robert Kampfl, Munich (DE); Thomas Burmeister, Munich (DE)

(73) Assignee: Bauer Kompressoren GmbH, Munich (DE)

( * ) Notice: Subject to any disclaimer, the term of this patent is extended or adjusted under 35 U.S.C. 154(b) by 1415 days.

(21) Appl. No.: 16/671,998

(22) Filed: Nov. 1, 2019

(65) Prior Publication Data
US 2020/0141887 A1    May 7, 2020

(30) Foreign Application Priority Data

Nov. 2, 2018    (DE) ...................... 10 2018 008 636.5

(51) Int. Cl.
| | |
|---|---|
| *G01N 25/66* | (2006.01) |
| *B01D 53/28* | (2006.01) |
| *G01N 1/22* | (2006.01) |
| *G01N 5/02* | (2006.01) |
| *G01N 25/56* | (2006.01) |

(52) U.S. Cl.
CPC ............. *G01N 25/66* (2013.01); *B01D 53/28* (2013.01); *G01N 1/2247* (2013.01); *G01N 5/025* (2013.01); *G01N 25/56* (2013.01)

(58) Field of Classification Search
CPC ...... G01N 25/66; G01N 1/2247; G01N 5/025; G01N 25/56; B01D 53/28; F17C 5/06; F17C 13/02; F17C 2223/033; F04B 39/16

USPC ........................................................ 374/28
See application file for complete search history.

(56) References Cited

U.S. PATENT DOCUMENTS

| | | | | |
|---|---|---|---|---|
| 3,555,787 | A * | 1/1971 | Lustig | F24F 3/12 |
| | | | | 96/372 |
| 6,073,479 | A * | 6/2000 | Shapiro | G01N 25/68 |
| | | | | 374/22 |
| 2018/0111095 | A1* | 4/2018 | Slatman | B01D 63/02 |
| 2021/0132135 | A1* | 5/2021 | Osuga | G01R 31/2877 |

FOREIGN PATENT DOCUMENTS

WO    WO-2008014843 A1 *    2/2008    .............. B60T 17/02

* cited by examiner

*Primary Examiner* — Brandi N Hopkins
*Assistant Examiner* — Janice M Soto
(74) *Attorney, Agent, or Firm* — Henry M. Feiereisen LLC

(57) ABSTRACT

A moisture measuring device for gases, in particular compressed gases, compressed air and the like, for moisture content detection in a gas supply system, includes a gas sampling input for the test gas which is connected to the gas supply system. A separate gas channel used only for the moisture measurement branches off from the gas sampling input. The separate gas channel is connected with a measuring cell in which a dew point sensor is arranged. A drying cell with a drying agent is connected downstream of the measuring cell. The drying cell is substantially hermetically sealed against the outside environment. Lastly, the output side of the drying cell is connected to an outlet channel leading to the outside environment. A gas supply system may have the form of a compressed gas system, a compressor station, a storage system and the like.

16 Claims, 1 Drawing Sheet

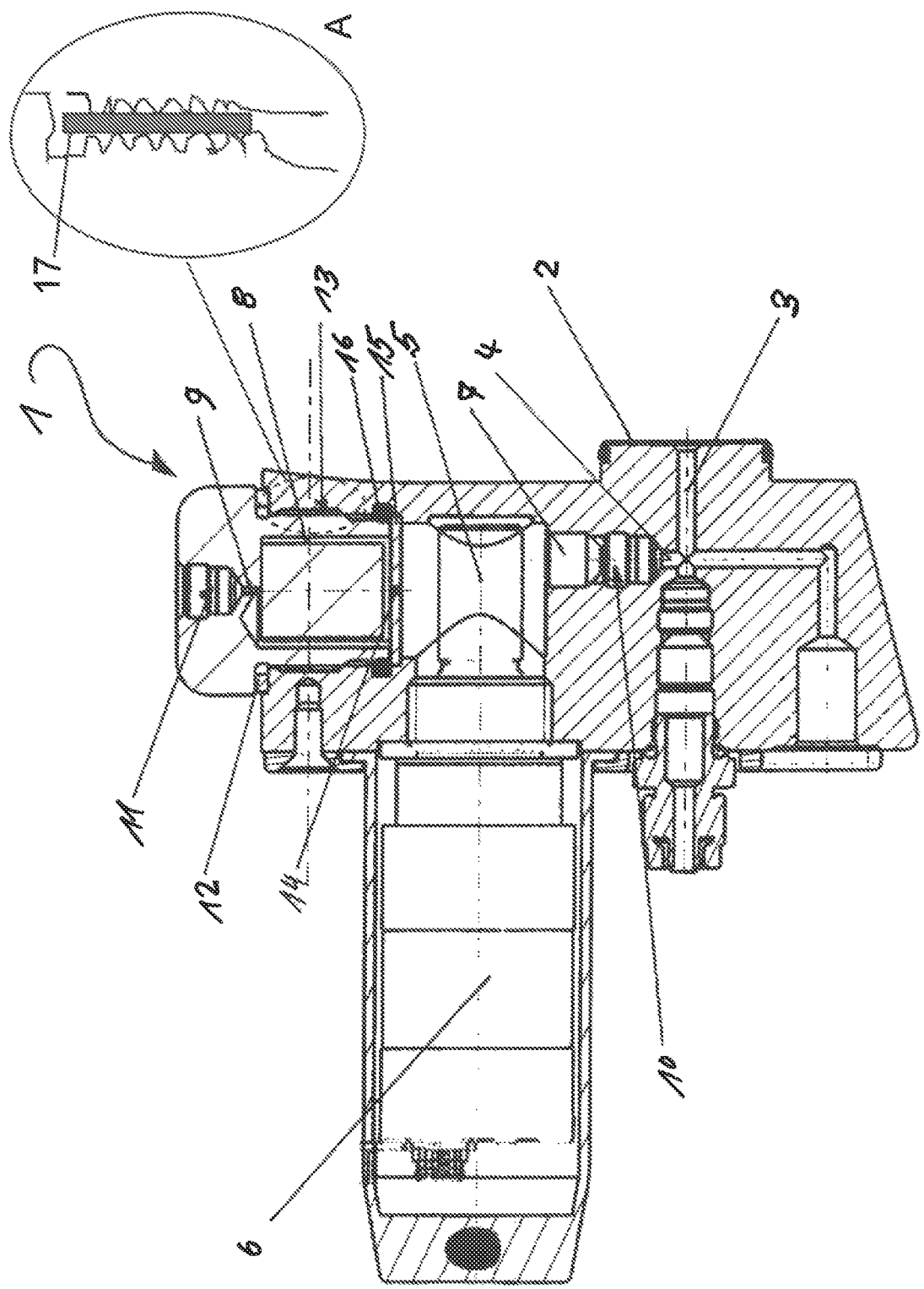

MOISTURE MEASURING DEVICE FOR GASES

CROSS-REFERENCES TO RELATED APPLICATIONS

This application claims the priority of German Patent Application, Serial No. 10 2018 008 636.5, filed Nov. 2, 2018, pursuant to 35 U.S.C. 119(a)-(d), the content of which is incorporated herein by reference in its entirety as if fully set forth herein.

BACKGROUND OF THE INVENTION

The present invention relates to a moisture measuring device for gases, in particular for compressed gases, compressed air or the like, for detecting the moisture content in gas supply systems. Gas supply systems include, more particularly, gas supply systems such as compressor stations, storage systems or the like.

The following discussion of related art is provided to assist the reader in understanding the advantages of the invention, and is not to be construed as an admission that this related art is prior art to this invention.

A conventional moisture measuring device for gases includes a gas sampling input connected to the gas supply system for the gas to be measured and a dew point sensor. In such a conventional moisture measuring device, considerable time elapses until the provided dew point sensor reliably measures the detected moisture content because typically additional sensor systems are also supplied with test gas via a gas sampling input, so that moisture resides and can accumulate in the gas channel connected to the gas sampling input for the gas to be measured even when the gas supply system is disconnected. Therefore, long waiting periods were hitherto necessary for a reliable moisture content measurement.

It would therefore be desirable and advantageous to obviate prior art shortcomings and to provide an improved moisture measuring device for gases which allows a timely, reliable and precise moisture content measurement.

SUMMARY OF THE INVENTION

According to one aspect of the present invention, a moisture measuring device for a gas in a gas supply system includes a gas sampling input connected to the gas supply system for the gas to be measured, a measuring cell which is substantially hermetically sealed against an outside environment and which has an outlet channel connected to the outside environment, a dew point sensor arranged in the measuring cell, a separate gas channel branching off from the gas sampling input and connected to the measuring cell, with the separate gas channel being used only for moisture measurement, and a drying cell connected downstream of the measuring cell and containing a drying agent.

With the solution according to the invention, a gas channel is provided which branches off from the gas sampling input and which is used only for measuring moisture. Thus, the moisture measurement takes place with the inventive solution independent of possible additional sensors arranged downstream for possible detection of other gas constituents.

The dew point sensor is arranged in a measuring cell which is connected for communication with the separate gas channel. To obtain a measurement result that is largely unaffected by moisture in the measurement cell or with line sections connected thereto, the measuring cell is connected for communication with a downstream drying cell, in which a drying agent is provided. This allows the measuring cell to be largely sealed from the outside environment and to be kept as dry as possible, so that a precise and reliable moisture content measurement in the measurement cell can performed with the dew point sensor. Therefore, it is not necessary to wait until the dew point sensor delivers reliable values that are largely unaffected by the moisture content in the measuring cell, since the measuring cell is largely free from moisture at the start of the measurement.

Specifically, the drying cell is substantially hermetically sealed from the outside environment so that even when the moisture measuring device is not active, it is almost impossible for moisture to enter the measuring cell from the outside environment.

Embodiments of the present invention may include one or more of the following features.

Advantageously, in particular when the gas supply is disconnected, the separate gas channel which is used only for the moisture measurement may be shut off on the input side upstream of the measuring cell and/or downstream of the drying cell. Shut-off may occur, for example, by way of a valve or preferably a check valve. If a check valve is provided, opening and closing takes place without manual intervention.

In particular, a nozzle, which is preferably provided in a separating disk disposed between the measuring cell and the drying cell, may be provided between the measuring cell and the drying cell. With this nozzle constriction, the drying agent in the drying cell can reliably ensure that the measuring cell stays dry.

Advantageously, for hermetic sealing against the outside environment, the output side of the drying cell has a combined metal seal and/or polymer seal. Furthermore, existing threaded connections may be sealed with a thread sealing tape, preferably a Teflon) sealing tape, in order to prevent moisture from entering through the threads.

According to another advantageous feature of the present invention, a nozzle operating as a pressure reducer may be disposed in the separate branching gas channel upstream of the measuring cell. This allows the pressure of the test gas to be lowered preferably to atmospheric pressure before it flows into the measuring cell in which the dew point sensor is arranged. Furthermore, threads may be made by shaping. In this way, as little moisture as possible can adhere to the threads, as these are formed to be smooth with an extremely small surface roughness.

Advantageously, a molecular sieve, silica gel, activated alumina or activated carbon may be considered for the drying agents. Advantageously, molecular sieve having sizes of 3 Å, 4 Å or 10 Å have been found to be useful as drying agent.

According to another advantageous feature of the present invention, the moisture measuring device may be formed as an independent, self-contained, mobile device.

Advantageously, the moisture content measuring device according to the invention may also be integrated in the gas supply system, preferably in a compressor station.

In summary, as a salient feature of the present invention, the moisture measuring device has a gas channel that branches off from the gas sampling inlet and is used only for moisture measurement, to allow the moisture measurement independent of possible additional sensors for other gas components.

In this separate channel used only for moisture measurement, a measuring cell may be arranged, in which the dew point sensor may be disposed. To keep the measuring cell with the dew point sensor provided therein substantially free of moisture, a drying cell may be arranged downstream of the measuring cell in communication therewith. In the drying cell, a drying agent disposed in the drying cell keeps the measuring cell substantially or completely free of moisture.

For measuring the moisture as rapidly as possible and unaffected by the environment, the drying cell is hermetically sealed against the outside environment.

With the inventive design of the moisture measuring device, reliable moisture content values can thus be reliably detected in the measuring cell with the dew point sensor after the test gas enters the measuring cell.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows in cross-section a moisture measuring device for gases according to the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to FIG. 1, there is shown a measuring device 1 for gases, especially for compressed gases. A gas sampling input 2 is connected to an unillustrated gas supply system. Gas supply systems are in particular pressurized gas supply systems, such as compressor stations, storage systems and the like.

The gas entering from the supply system via the gas sampling input 2 flows through a gas inlet passage 3. Therefrom, a separate gas channel 4 used only for the moisture measurement branches off.

The connecting passages arranged downstream of the branching-off gas channel 4 lead to additional unillustrated sensor arrangements for possibly determining further gas constituents.

The separate, branching-off gas channel 4 is in communication with a measuring cell 5 in which a dew point sensor 6 is arranged. A nozzle 7 which serves as a pressure reducing valve and reduces the gas pressure to approximately atmospheric pressure is arranged in the separate gas channel 4 upstream of the measuring cell 5. The measuring cell 5 is in communication with the downstream drying cell 8, in which an unillustrated drying agent is disposed. The drying cell 8 is substantially hermetically sealed against the outside environment. An outlet channel 9 which leads from the drying cell 8 to the outside environment branches off on the output side.

In order to prevent ingress of moisture when the gas supply is shut off, the separate gas channel 4 can be shut off on the input side upstream of the measuring cell 5 and/or downstream of the drying cell 8, for which purpose exemplary check valves 10, 11 are shown in the sole FIGURE.

A combined metal and polymer seal 12 is provided on the output side of the drying cell 8 for hermetically sealing the drying cell 8 against the outside environment. Existing threaded connections, which are indicated schematically by the reference symbol 13, can be additionally sealed with a thread sealing tape 17. The threads can preferably be formed by shaping in order to obtain the smoothest possible surfaces of the threaded connections.

A nozzle 14, which in the illustrated example is formed by a separation disk 15 disposed between the measuring cell 5 and the drying cell 8, is arranged between the measuring cell 5 and the drying cell 8. This separation disk 15 is retained and sealed by an elastomer seal 16.

Although not shown in detail, a molecular sieve, silica gel, activated alumina, activated carbon and the like may be used as a drying agent. If a molecular sieve is employed, the molecular sieve may have a size of 3 Å, 4 Å or 10 Å.

The moisture measuring device 1 designed according to the invention may be constructed as an independent, self-sufficient, mobile device, or may be integrated, for example, in a gas supply system, such as a compressor station.

To prevent ingress of significant quantities of moisture when the gas supply is disconnected, a shut-off device, such as a check valve 10, is arranged in the gas channel 4 upstream of the measuring cell 5. If necessary, a shut-off device can also be provided downstream of the drying cell 8 which can be formed of the illustrated check valve 11. In this way, when the gas supply is switched off, the entire region of separate branching-off gas channel 4 with the measuring cell 5 or the drying cell 8 can be reliably shut off and thus kept as dry as possible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application, in particular a separate gas channel 4 used only for measuring moisture, wherein the gas channel 4 is connected for communication with a measuring cell 5 and a downstream drying cell 8, to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A moisture measuring device for a gas in a gas supply system, comprising:
   a gas sampling input connected to the gas supply system for the gas to be measured,
   a measuring cell which is substantially hermetically sealed against an outside environment and which has an outlet channel connected to the outside environment,
   a dew point sensor arranged in the measuring cell,
   a separate gas channel branching off from the gas sampling input and connected to the measuring cell, with the separate gas channel being used only for moisture measurement,
   a drying cell connected downstream of the measuring cell and containing a drying agent, and
   a nozzle arranged between the measuring cell and the drying cell.

2. The moisture measuring device of claim 1, wherein the nozzle is arranged in a separating disc disposed between the measuring cell and the drying cell.

3. The moisture measuring device of claim 1, further comprising a combined metal and polymer seal arranged on an output side of the drying cell for hermetic sealing against the outside environment.

4. The moisture measuring device of claim 1, further comprising a threaded connection disposed between the drying cell and a housing of the moisture measuring device and sealed by way of thread sealing tape.

5. The moisture measuring device of claim 4, wherein threads of the threaded connection are made by shaping.

6. The moisture measuring device of claim 1, wherein the separate, branching-off gas channel comprises a further nozzle arranged upstream of the measuring cell and operating as a pressure reducer.

7. The moisture measuring device of claim 1, wherein the drying agent is composed of a material selected from a molecular sieve, silica gel, activated alumina and activated carbon.

8. The moisture measuring device of claim 7, wherein the molecular sieve has a size of 3 Å, 4 Å or 10 Å.

9. The moisture measuring device of claim 1, wherein the moisture measuring device is constructed as an independent, self-sufficient, mobile device.

10. The moisture measuring device of claim 1, wherein the moisture measuring device is integrated in the gas supply system.

11. The moisture measuring device of claim 10, wherein the moisture measuring device is integrated in a compressor station of the gas supply system.

12. The moisture measuring device of claim 1, wherein the gas supply systems comprise systems selected from pressurized gas supply systems, compressor stations and gas storage systems.

13. The moisture measuring device of claim 1, wherein the gas comprises a compressed gas or compressed air.

14. The moisture measuring device of claim 1, further comprising an input-side valve arranged in the separate gas channel upstream of the measuring cell, or an output-side valve arranged downstream of the drying cell, or both.

15. The moisture measuring device of claim 14, wherein the input-side valve is a check valve.

16. The moisture measuring device of claim 14, wherein the output-side valve is a check valve.

* * * * *